(12) United States Patent
Russell et al.

(10) Patent No.: US 9,379,898 B2
(45) Date of Patent: *Jun. 28, 2016

(54) METHODS, SYSTEMS, AND COMPUTER PROGRAM PRODUCTS FOR PROVIDING BILLING AND USAGE DATA TO DOWNSTREAM APPLICATIONS

(75) Inventors: Travis E. Russell, Clayton, NC (US); Peter J. Marsico, Chapel Hill, NC (US)

(73) Assignee: TEKELEC, INC., Morrisville, NC (US)

(*) Notice: Subject to any disclaimer, the term of this patent is extended or adjusted under 35 U.S.C. 154(b) by 1853 days.

This patent is subject to a terminal disclaimer.

(21) Appl. No.: 11/809,201

(22) Filed: May 31, 2007

(65) Prior Publication Data

US 2008/0273679 A1    Nov. 6, 2008

Related U.S. Application Data

(60) Provisional application No. 60/927,730, filed on May 4, 2007.

(51) Int. Cl.
*H04M 15/00* (2006.01)
*H04L 12/14* (2006.01)

(52) U.S. Cl.
CPC ............ *H04L 12/14* (2013.01); *H04L 12/1403* (2013.01)

(58) Field of Classification Search
CPC ..... H04M 15/00; H04M 15/41; H04M 15/47; H04M 15/58; H04M 2215/0148; H04M 2215/0164; H04M 2215/0188
USPC ........................................ 379/114.03–127.05
See application file for complete search history.

(56) References Cited

U.S. PATENT DOCUMENTS

| | | |
|---|---|---|
| 3,917,915 A | 11/1975 | Karras |
| 4,162,377 A | 7/1979 | Mearns |
| 4,191,860 A | 3/1980 | Weber |
| 4,310,727 A | 1/1982 | Lawser |

(Continued)

FOREIGN PATENT DOCUMENTS

| | | |
|---|---|---|
| CN | 1 236 390 C | 1/2006 |
| EP | 0 088 639 A2 | 9/1983 |

(Continued)

OTHER PUBLICATIONS

Communication of European Publication No. and Information on the Application of Article 67(3) EPC for European Patent Application No. 08767552.6 (Jan. 7, 2010).

(Continued)

*Primary Examiner* — Solomon Bezuayehu
(74) *Attorney, Agent, or Firm* — Jenkins, Wilson, Taylor & Hunt, P.A.

(57) ABSTRACT

It is an object of the presently disclosed subject matter to provide billing and usage data to downstream applications. According to one aspect, the subject matter described herein includes a method for acquiring billing and usage data in an IP multimedia subsystem (IMS) environment. The method includes copying at least one of a call signaling message and an IMS accounting message relating to an IMS transaction upstream from a billing system (BS) and providing the at least one copied message to an application for one of billing verification, fraud detection, revenue assurance, and data analysis. The types of acquired data may be copied separately or in combination, and the copied data may be examined, compared, or otherwise utilized separately or in combination.

25 Claims, 13 Drawing Sheets

(56) References Cited

U.S. PATENT DOCUMENTS

| | | | |
|---|---|---|---|
| 4,313,035 A | 1/1982 | Jordan et al. | |
| 4,385,206 A | 5/1983 | Bradshaw et al. | |
| 4,748,653 A | 5/1988 | Kerr | |
| 4,756,020 A | 7/1988 | Fodale | |
| 4,760,594 A | 7/1988 | Reed | |
| 4,769,834 A | 9/1988 | Billinger et al. | |
| 4,788,718 A | 11/1988 | McNabb et al. | |
| 4,811,378 A | 3/1989 | Else et al. | |
| 4,897,835 A | 1/1990 | Gaskill et al. | |
| 4,897,870 A | 1/1990 | Golden | |
| 4,959,849 A | 9/1990 | Bhusri | |
| 4,972,461 A | 11/1990 | Brown et al. | |
| 5,008,929 A | 4/1991 | Olsen et al. | |
| 5,134,651 A | 7/1992 | Ortiz et al. | |
| 5,150,357 A | 9/1992 | Hopner et al. | |
| 5,218,632 A | 6/1993 | Cool | |
| 5,265,157 A | 11/1993 | Jolissaint et al. | |
| 5,291,481 A | 3/1994 | Doshi et al. | |
| 5,315,580 A | 5/1994 | Phaal | |
| 5,361,297 A | 11/1994 | Ortiz et al. | |
| 5,402,474 A | 3/1995 | Miller et al. | |
| 5,408,524 A | 4/1995 | Reum | |
| 5,426,688 A | 6/1995 | Anand | |
| 5,430,709 A | 7/1995 | Galloway | |
| 5,438,570 A | 8/1995 | Karras et al. | |
| 5,457,729 A | 10/1995 | Hamann et al. | |
| 5,473,596 A | 12/1995 | Garafola et al. | |
| 5,475,732 A | 12/1995 | Pester, III | |
| 5,506,893 A | 4/1996 | Buscher et al. | |
| 5,509,055 A | 4/1996 | Ehrlich et al. | |
| 5,521,902 A | 5/1996 | Ferguson | |
| 5,539,804 A | 7/1996 | Hong et al. | |
| 5,579,371 A | 11/1996 | Aridas et al. | |
| 5,592,530 A | 1/1997 | Brockamn et al. | |
| 5,606,600 A | 2/1997 | Elliott et al. | |
| 5,712,908 A | 1/1998 | Brinkman et al. | |
| 5,768,352 A | 6/1998 | Elliott et al. | |
| 5,774,532 A | 6/1998 | Gottlieb et al. | |
| 5,784,443 A | 7/1998 | Chapman et al. | |
| 5,854,834 A | 12/1998 | Gottlieb et al. | |
| 5,926,533 A | 7/1999 | Gainsboro | |
| 5,949,864 A | 9/1999 | Cox | |
| 6,016,343 A | 1/2000 | Hogan et al. | |
| 6,028,914 A | 2/2000 | Lin et al. | |
| 6,108,782 A | 8/2000 | Fletcher et al. | |
| 6,111,946 A | 8/2000 | O'Brien | |
| 6,134,307 A | 10/2000 | Broukman et al. | |
| 6,137,869 A | 10/2000 | Voit et al. | |
| 6,249,572 B1 | 6/2001 | Brockman et al. | |
| 6,256,379 B1 | 7/2001 | Gillespie | |
| 6,327,350 B1 | 12/2001 | Spangler et al. | |
| 6,385,301 B1 | 5/2002 | Nolting et al. | |
| 6,826,198 B2 | 11/2004 | Turina et al. | |
| 6,854,014 B1* | 2/2005 | Amin et al. | 709/227 |
| 6,891,938 B1 | 5/2005 | Scott et al. | |
| 6,968,048 B2 | 11/2005 | Moisey et al. | |
| 6,970,542 B2 | 11/2005 | Moisey et al. | |
| 7,023,838 B1 | 4/2006 | Hahn et al. | |
| 7,231,024 B2 | 6/2007 | Moisey et al. | |
| 7,626,938 B1 | 12/2009 | Orr et al. | |
| 7,797,411 B1 | 9/2010 | Guruswamy et al. | |
| 7,865,944 B1 | 1/2011 | Shu et al. | |
| 8,179,895 B2 | 5/2012 | Lean et al. | |
| 2003/0016679 A1 | 1/2003 | Adams et al. | |
| 2003/0026257 A1 | 2/2003 | Xu et al. | |
| 2003/0096592 A1 | 5/2003 | Moreau et al. | |
| 2003/0187800 A1 | 10/2003 | Moore et al. | |
| 2004/0170133 A1 | 9/2004 | Oguchi et al. | |
| 2004/0184440 A1 | 9/2004 | Higuchi et al. | |
| 2004/0193909 A1 | 9/2004 | Chang et al. | |
| 2004/0264405 A1 | 12/2004 | Scobbie | |
| 2005/0041584 A1 | 2/2005 | Lau | |
| 2005/0047569 A1* | 3/2005 | Moisey et al. | 379/126 |
| 2005/0111640 A1* | 5/2005 | Moisey | H04M 3/2218 |
| | | | 379/114.2 |
| 2005/0276387 A1 | 12/2005 | Ethier et al. | |
| 2005/0281399 A1* | 12/2005 | Moisey et al. | 379/126 |
| 2006/0291486 A1* | 12/2006 | Cai et al. | 370/401 |
| 2007/0041536 A1* | 2/2007 | Koskinen | H04M 15/31 |
| | | | 379/114.28 |
| 2007/0091862 A1 | 4/2007 | Ioannidis | |
| 2007/0121615 A1 | 5/2007 | Weill et al. | |
| 2007/0201621 A1* | 8/2007 | Ethier et al. | 379/32.05 |
| 2007/0226374 A1 | 9/2007 | Quarterman et al. | |
| 2008/0010179 A1* | 1/2008 | Cai et al. | 705/34 |
| 2008/0205381 A1* | 8/2008 | Zhu et al. | 370/352 |
| 2008/0261559 A1* | 10/2008 | Cai et al. | 455/406 |
| 2011/0280192 A1* | 11/2011 | Duan | 370/328 |

FOREIGN PATENT DOCUMENTS

| | | |
|---|---|---|
| EP | 0 212 654 | 5/1987 |
| EP | 0 258 654 A2 | 3/1988 |
| EP | 0 264 023 A2 | 4/1988 |
| EP | 0 487 197 A2 | 5/1992 |
| EP | 2 149 222 A | 2/2010 |
| JP | 58215164 | 12/1983 |
| JP | 62200859 | 9/1987 |
| WO | WO 84/01073 | 3/1984 |
| WO | WO 86/03915 | 7/1986 |
| WO | WO 88/00419 | 1/1988 |
| WO | WO 01/20920 | 3/2001 |
| WO | WO-02-098099 A1 | 12/2002 |
| WO | WO 2008/137116 A1 | 11/2008 |

OTHER PUBLICATIONS

Internation Preliminary Report on Patentability for International Patent Application No. PCT/US2008/005745 (Nov. 10, 2009).

3GPP, "3rd Generation Partnership Project; Technical Specification Group Service and System Aspects; Telecommunication Management; Charging Management; Diameter Charging Applications," 3GPP TS 32.299, v7.5.0 Release 7 (Mar. 2007).

3GPP, "3rd Generation Partnership Project; Technical Specification Group Service and System Aspects; Telecommunication management; Charging management; Diameter charging applications," 3GPP TS 32.299, v7.4.0. Release 7 (Dec. 2006).

Openet Telecom, "Openet Announces Fusionworks IMS," Press Release (Feb. 13, 2006).

"TR 45 All-IP Core Network Multimedia Domain, IP Multimedia Subsystem—Changing Architecture," PN-4935.7 (Publication date unknown).

Calhoun et al., "Diameter Base Protocol," Network Working Group, RFC 3588 (Sep. 2003).

First Office Action for Chinese Patent Application No. 200880023074.X (Jan. 30, 2012).

Notification of Transmittal of the International Search Report and the Written Opinion of the International Searching Authority, or the Declaration for International Application No. PCT/US02008/005745 (Aug. 19, 2008).

Second Office Action for Chinese Patent Application No. 200880023074.X (Oct. 30, 2012).

Supplemental Notice of Allowability for U.S. Appl. No. 11/888,628 (Apr. 9, 2012).

Notice of Allowance and Fee(s) Due for U.S. Appl. No. 11/888,628 (Dec. 8, 2011).

Interview Summary for U.S. Appl. No. 11/888,628 (Aug. 29, 2011).

Non-Final Official Action for U.S. Appl. No. 11/888,628 (May 25, 2011).

Interview Summary for U.S. Appl. No. 11/888,628 (Jul. 15, 2010).

Final Official Action for U.S. Appl. No. 11/888,628 (Mar. 3, 2010).

Non-Final Official Action for U.S. Appl. No. 11/888,628 (Jun. 24, 2009).

Notice of Allowance and Fee(s) Due for U.S. Appl. No. 11/156,997 (Jan. 17, 2007).

"GPRS Tunneling Protocol (GTP)," Trillium, Continuous Computing, pp. 1-3 (Copyright 2007).

Notice of Allowance and Fee(s) Due for U.S. Appl. No. 10/654,499 (Aug. 1, 2005).

(56) References Cited

OTHER PUBLICATIONS

Non-Final Office Action for U.S. Appl. No. 10/654,499 (Jan. 28, 2005).
"Digital Cellular Telecommunications System (Phase 2+); General Packet Radio Service (GPRS); GPRS Tunnelling Protocol (GTP) Across the Gn and Gp Interface (3GPP TS 09.60 version 7.6.0 Release 1998)", ETSI TS 101 347, pp. 1-67 (Sep. 2000).
Anonymous, "Operations, Maintenance and Administration Part (OMAP)," International Telecommunications Union, p. 485-531, (Jul. 27, 1999).
General Signal Networks, "SS7 Performance Management System," www.gsnetworks.com/powerof7/index.html (Downloaded Jul. 18, 1999).
Danar Corporation, "About Syzgy," (Downloaded Jul. 14, 1999).
HOMISCO/VOICENET Inc., "Features," www.homisco.com/SS7/page7.html (Downloaded Jul. 14, 1999).
Wavtek Wandel Goltermann, "8620 SS7 Signaling Surveillance System," Switching Test Solutions AG, (Jun. 15, 1999).
Hanley, "Fight for the Future: Test Vendors Try to Get The Edge on Unstandarized Technology With Flexible, Forward-Thinking Products," Telephony, p. 52-54, (Mar. 8, 1999).
Data Gulper, "Load your data warehouse 10 times faster. Concurrently load up to 500+ online feeds. Filter out useful data and store it quickly," Compendium Research Corporation, (May 2, 1998).
TEKELEC, "EAGLE STP: STP-LAN Interface Feature," (May 2, 1997).
Hewlett Packard, "HP acceSS7 Signaling Monitoring System", Hewlett Packard Co., (May 2, 1995).
Tekelec, "Proposal for MCI Billing System," (Nov. 2, 1993).
Tekelec, "Common Channel Signaling System 7 Link Monitoring," Response to Request for Proposal from Southwestern Bell Telephone (Jul. 2, 1993).
Blake, "Fast, Smart and in Control Signaling System 7 is Helping Bring the Intelligent Network to the End User," in Perspective, p. 20-23, (May 2, 1993).
Bellcore, "Generic Requirements for Common Channel Signaling (CCS) Network Usage Measurement Functionality," Technical Advisory, p. 1-76, (Dec. 2, 1992).
Kritzmacher et al., "Recommendations for SS7 Reliability," TE&M, p. 35-36, 38, (Nov. 1, 1992).
Bellcore, "Request for Industry Input: Extending a Signal Transfer Point Adjunct Beyond Usage/Billing Measurements," Digest, p. 33, (Jun. 2, 1992).
Tekelec, "IDS Enhanced Gateway Billing System User's Manual," (Jan. 22, 1992).
Federal Communications Commission, "Notice of Inquiry," Federal Communications Commission, (Dec. 6, 1991).
TEKELEC, "Intelligent Database Services Billing System User's Manual," p. 1-1-2-18, (Apr. 2, 1991).
Hester, "Can You Afford to Be Without SS7 Network Surveillance," Telephony, (Dec. 3, 1990).
Lanning, "SS7 Interconnection Awaits Green Light," Telephony's Transmission Special, p. 32, 34, (Nov. 2, 1990).
Anonymous, "Intelligent Networking: CCS7 Message Detail Recording Enables Usage-Sensitive Billing at Gateway DMS-STPs," p. 4-5, (Jul. 2, 1990).
Telcordia Technologies, "A Framework of High-Level Requirements and Considerations for Common Channel Signaling Network Usage Measurements to Support Billing and Bill Verification," Framework Technical Advisorv,p. 1-40, A-1-R-4, (Jan. 2, 1990).
Buckles, "SS7 Gateways Serve and Protect," Telephony, p. 39-41, 44, (Nov. 20, 1989).
Rusin, "Voice Processing and the Intelligent Network," TE&M, p. 51-68.
Protocol Technologies, "Template Trap and Trace," p. 7-1-7-52, (Feb. 2, 1989).
Anonymous, "An Independent Future," Rural Telecommunications, (1989).
Anonymous, "A New Network," TE&M, (Dec. 1, 1988).
Marshall, "Maintaining the CCS Network," TE&M, p. 78-80, (Nov. 1, 1988).
Stusser, "Call Accounting Needs Five New Features," Business Communication Review, p. 45-48, (Sep. 28, 1988).
Anonymous, "Independent SS7 Network Questions and Answers," (Aug. 2, 1988).
Parsons, "Update: Financial Considerations and Network Control Most Important for Independent Telcos Examining SS7," p. 1-4, (Aug. 2, 1988).
Hilton et al., "Common Channel Signaling for Independents," TE&M, (Jun. 15, 1988).
Anonymous, "Independent SS7 Network SSP Solutions," (May 2, 1988).
Parsons, "A800: A Decision to Remain Independent," p. 1-4, (May 2, 1988).
Anonymous, "American National Standard for Telecommunications—Monitoring and Measurements for Signaling System 7 Networks," (1988).
Faletti et al., "Signaling System #7: The Corporate Network Backbone," IEEE Global Telecommunications Conference, Hollywood, Florida, p. 10.2.1-10.2.9, (1988).
Rose, "Understanding the Intelligent Network," OPASTCO ROUNDTABLE (1988).
Titch, "The Pipe and the Protocol," Closeup Supplement to Communications Magazine (1988).
Protocol Technologies, "#7 MGTS Monitor Trap Overview," MGTS User's Guide p. 5.9.0-5.9.36 (Dec. 2, 1987).
Protocol Technologies, "Protocol Technologies User's Guide: Message Generator/Traffic Simulator," p. 1-1-8-2 (Apr. 2, 1987).
Chow et al., "CCITT Signaling System No. 7: The Backbone for Intelligent Network Services," Globecom, p. 40.1.1-40.1.5, (1987).
Worrall, "Virtual Network Capabilities—The Next Phase of the 'Intelligent Network'," Globecom (1987).
Anonymous, "Systems Engineering Requirements for the 1ESS Switch Automatic Message Account Transmitter (AMAT)," Telcordia Technologies, Inc., (Abstract Only) (Nov. 2, 1985).
Szybicki, "Adaptive, Tariff Dependent Traffic Routing and Network management in Multi-Service Telecommunications Networks," Elsevier Science Publisher B.V., p. 614-621, (Sep. 4-11, 1985).
Hayward, "Traffic Engineering in a New competitive Environment," Elsevier Science Publishers B.V., p. 1112-1116, (May 24, 1985).
Wang et al., "Database Administration System—Architecture and Design Issues," The Bell System Technical Journal, p. 2431-2458, (Nov. 1982).
Anonymous, "Billing Usage Measurements/Automatic Message Accounting," Telcordia Technologies, Inc. Project Abstracts (Publication Date Unknown).
Anonymous, "Block Diagram of Unisys SS7 Billing System," (Publication Date Unknown).
Anonymous, "Sterling 5000 Data Processing & Management System: Real Time Billing Data Collection and Processing System,"Telesciences, (Publication Date Unknown).
Anonymous, "The Sterling Data Server Family: The Advanced Intelligent Network Billing Mediation Platform," Telesciences, (Publication Date Unknown).
DSC Communications, "DSC Signs Agreements With Unisys for Intelligent Network Measurement and Monitoring Systems," Press.
NORTEL, "CCS7 Message Record/Billing," (Publication Date Unknown).
SETTE, "Intermediate Signaling Network Identification," (Publication Date Unknown).
SETTE, "Intermediate Signaling Network Identification," Bellcore, p. 1-10, (Publication Date Unknown).
Fourth Office Action for Chinese Patent Application No. 200880023074.X (Sep. 16, 2013).
First Examination Report for Indian Patent Application No. 7133/CHENP/2009 (Mar. 18, 2015).
Rejection Decision for Chinese Patent Application No. 200880023074.X (Jun. 19, 2014).
Fifth Office Action for Chinese Patent Application No. 200880023074.X (Jan. 23, 2014).
Extended European Search Report for European Patent Application No. 08767552.6 (Jul. 29, 2013).

(56) References Cited

OTHER PUBLICATIONS

Third Office Action for Chinese Patent Application No. 200880023074.X (Apr. 12, 2013).
Reexamination Board Decision for Chinese Patent Application No. 200880023074.X (Sep. 30, 2015).
Decision to Grant for European Patent Application No. 08767552.6 (Sep. 17, 2015).
Communication under Rule 71(3)—Intent to Grant for European Patent Application No. 08767552.6 (Jul. 3, 2015).
Notification of Reexamination for Chinese Patent Application No. 200880023074.X (Jun. 30, 2015).

* cited by examiner

METHODS, SYSTEMS, AND COMPUTER PROGRAM PRODUCTS FOR PROVIDING BILLING AND USAGE DATA TO DOWNSTREAM APPLICATIONS

RELATED APPLICATIONS

This application claims the benefit of U.S. Provisional Patent Application Ser. No. 60/927,730, filed May 4, 2007; the disclosure of which is incorporated herein by reference in its entirety.

TECHNICAL FIELD

The subject matter described herein relates to providing data to applications. More specifically, the subject matter relates to providing billing and usage data to downstream applications.

BACKGROUND

In current communications networks, when session initiation protocol (SIP) messages are used in association with a session or event, accounting information is typically generated so that appropriate billing records may be created. In addition, various downstream applications may examine the billing records for purposes such as billing verification, fraud detection, revenue assurance and data analysis.

For example, SIP messaging may be used in an Internet protocol (IP) multimedia subsystem (IMS) environment, for instant messaging (IM), voice-over-IP (VoIP), and other IP-based telephony solutions. In an IMS environment, accounting information may be generated by a network entity (NE) such as a short message service center (SMSC) upon the delivery or receipt of a short message service (SMS) message. This accounting information may include information extracted from SIP messages, as well as other accounting-related data, and may be passed to a function for converting the accounting information into a format called a charging detail record (CDR). The CDR may then be sent to a billing system, where it may be used to bill the subscriber for the session or event.

One problem associated with current SIP charging and verification systems is that they are susceptible to fraud. In one exemplary scenario, so-called "fraudsters" may exploit an aspect of conventional charging systems in order to defraud network operators. Typically, network entities such as SMSCs are responsible for both delivering messages to subscribers and for generating accounting information associated with the charging event (i.e. message delivery). In an online billing scenario, also referred to as prepaid billing, before delivering a message to a particular subscriber, the message may be cached while a prepaid application is queried to determine whether the subscriber has enough prepaid credit to deliver the message. However, the message volume associated with SMSCs is often so large that the SMSC cannot query the prepaid application without risking congestion or failure of the SMSC. Therefore, SMSCs may prioritize delivery of messages over querying the prepaid application or generating accounting information. In short, an overloaded SMSC may assume that a subscriber possesses enough prepaid credit to send the message and prevents congestion by not querying the prepaid application and not generating accounting information. Fraudsters may abuse this aspect of conventional charging systems to defraud network operators. They may begin by purchasing a prepaid card containing a small number of prepaid credit and attempt to send a large volume of messages such that the SMSC becomes overloaded and employs the procedures described above where each message attempt is delivered without validating the subscriber's prepaid credit amount or generating accounting information associated with the messages. Accordingly, downstream applications, such as billing verification applications, may not receive an indication that the fraud has occurred until it is too late. This can leave network operators with numerous and expensive uncollectible bills.

Another problem associated with current SIP charging and verification systems is that they are prone to error. For example, because billing systems are typically located downstream from the various network entities and applications involved in producing accounting information, data corruption may accumulate and hinder verification systems' ability to accurately audit SIP transactions. Therefore, even when accounting information is generated, by the time it has been examined and/or converted into additional formats it may include missing or incomplete data. This may produce inaccurate or under-billed records that cost network operators to correct.

Yet another problem associated with current SIP charging and verification systems is that they lack a redundant audit trail. In the event that accounting information is corrupted, incomplete, or not generated as described above, current verification systems lack the ability to correct corrupted data, complete incomplete records, or recreate missing information. They also lack the ability to tell network operators where in the information flow the error occurred so that it may be examined and corrected.

Accordingly, there exists a need for improved methods and systems for providing billing and usage data to downstream applications.

SUMMARY

It is an object of the presently disclosed subject matter to provide billing and usage data to downstream applications. According to one aspect, the subject matter described herein includes a method for acquiring billing and usage data in an IP multimedia subsystem (IMS) environment. The method includes copying at least one of a call signaling message and an IMS accounting message relating to an IMS transaction upstream from a billing system (BS) and providing the at least one copied message to an application for one of billing verification, fraud detection, revenue assurance, and data analysis. The types of acquired data may be copied separately or in combination, and the copied data may be examined, compared, or otherwise utilized separately or in combination.

According to another aspect, the subject matter described herein includes a system for acquiring billing and usage data in an IMS environment, where the system includes a message copy function (MCF) for copying at least one of a call signaling message and an IMS accounting message relating to an IMS transaction upstream from a billing system (BS), and a communications function for providing the at least one copied message to an application for one of billing verification, fraud detection, revenue assurance, and data analysis. Message copy functions may be located on various network entities and/or applications, and may acquire data in solitary fashion or in combination.

DETAILED DESCRIPTION

Figure 1:
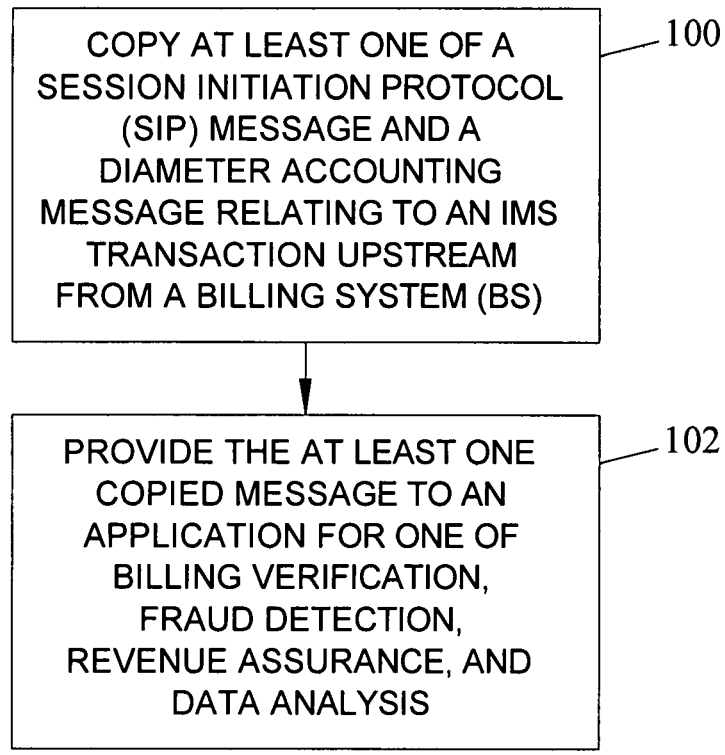
FIG. 1 is a flow chart of a process for providing billing and usage data to downstream applications according to the subject matter described herein.

FIG. 1 is a flow chart of a process for providing billing and usage data to downstream applications according to an embodiment of the subject matter described herein. Referring to FIG. 1, in block 100, at least one of a call signaling message and an IMS accounting message relating to an IMS transaction is copied upstream from a billing system (BS). As used herein, the term call signaling message may include messages related to establishing and controlling individual network connections, as well as network management. For example, a call signaling message may include a session initiation protocol (SIP) Invite message, a signaling system number 7 (SS7) ISDN user part (ISUP) message, a SIGTRAN message, and/or a call detail record (CLDR). Additionally, a CLDR may include a variety of call detail records including, but not limited to, an SS7 call detail record, an Internet protocol (IP) call detail record (IPDR), a session call detail record (SDR), and a transaction call detail record (TDR). It is appreciated that additional call signaling messages may be copied without departing from the scope of the subject matter described herein.

In a scenario where the copied call signaling message includes a SIP Invite message, the message may contain parameters examined by a downstream application. Exemplary SIP message parameters may include a sending subscriber identifier, a receiving subscriber identifier, a P-Associated uniform resource identifier (URI), a. P-Visited-Network-ID, P-Access-Network-Info, a P-Charging-Function-Address, and a P-Charging-Vector. However, it is appreciated that additional SIP information or SIP message types may be copied without departing from the subject matter described herein. It is further appreciated that the at least one copied call signaling message and IMS accounting message may include copying only call signaling messages, copying only IMS accounting messages, or copying both call signaling messages and IMS accounting messages without departing from the scope of the subject matter described herein.

An IMS accounting message, as used herein, may include a Diameter protocol-based message containing accounting information associated with a charging event. It is appreciated, however, that additional protocols suitable for transmitting IMS accounting information may be used without departing from the scope of the subject matter described herein. More specifically, the term IMS accounting message may include one of a raw IMS accounting message or a charging detail record (CDR), where a raw IMS accounting message includes a non-CDR message containing accounting information associated with an IMS charging event. Raw IMS accounting messages may be used to generate more formal charging detail records. For example, one or more raw IMS accounting messages may be generated by a charging trigger function (CTF) located at a network node based upon observed signaling messages. After receiving the one or more raw IMS accounting messages, a CDR may be generated based on the received raw IMS messages. In one embodiment, a charging data function (CDF) may convert raw IMS accounting messages into CDRs for examination by a downstream billing system.

It is further appreciated that the types of messages copied and/or generated by a message copy function instance may be determined by the location of the message copy function instance within the IMS charging network. Possible locations for MCF instances within the IMS charging network and the types of messages which may be copied by each MCF instance will be described in greater detail below with respect to FIGS. 2-13.

It is appreciated that message copying may be performed at various locations in a charging system. For example, in an offline IMS charging system, an IMS message copy function may be located at or incorporated with a charging data function (CDF) or a charging gateway function (CGF). The CDF may also be co-located or incorporated into the CGF forming a combined CDF/CGF entity. The message copy function described herein may be located on or incorporated with a network entity (NE), CDF, or CGF individually, or may be located on or incorporated with a combined CDF/CGF entity or combined NE/CDF/CGF entity. It is further appreciated that multiple message copy functions (also referred to as multiple instances of the message copy function) may be located at any of the above-named locations in an IMS charging network. Similarly, one or more message copy functions may be located on or incorporated with elements in an online charging environment. For example, an instance of a message copy function may be located at a NE and/or an online charging system (OCS), where the NE and OCS may additionally be combined into a single NE/OCS entity in some embodiments.

It is appreciated that a NE as described above may include a circuit-switched network element (CS-NE), a service network element, a SIP application server (AS), a media resource function controller (MRFC), a media gateway controller function (MGCF), a border gateway controller function (BGCF), a proxy call session control function (P-CSCF), an interrogating call session control function (I-CSCF), a serving call session control function (S-CSCF), a serving general packet radio service (GPRS) support node (SGSN), and a gateway GPRS support node (GGSN). Additional IMS network elements may be included without departing from the scope of the subject matter described herein.

In block 102, the at least one copied message may be provided to a downstream application for one of billing verification, fraud detection, revenue assurance, and data analysis. Because different types of messages may be copied at different points in the charging system, the downstream application may be provided with a wide variety of information associated with an IMS charging session or event. Additionally, the downstream application may be provided with timelier and more accurate information because it may be received directly from the source of the information at the time it was created. For example, a downstream billing verification application may be provided with at least one of a copied call signaling message, such as a SIP Invite message, and a IMS accounting message, such as a CDR.

Because copied messages may be associated with a common session or event, they may be compared or otherwise utilized together. One exemplary use includes detecting and generating missing IMS accounting messages based on copied call signaling messages. For example, a first instance of a message copy function may be located at a NE, such as a short message service center (SMSC), and may generate IMS accounting messages based on observed call signaling messages, such as SIP or SS7 signaling messages. In addition, a second instance of the message copy function may be located at a CGF for copying CDRs and providing them to a downstream application. Therefore, the downstream application, such as a billing verification application, may receive both call signaling messages and IMS accounting messages relating to the same transaction, and based on a comparison of the provided messages, may detect any discrepancies in order to detect possible fraud. Such an embodiment requires that independent message copy functions be located at multiple locations in the charging network, and will be described in greater detail below with respect to the offline embodiment illustrated in FIG. 11 and the online embodiment illustrated in FIG. 13. However, single-instance message copy function embodiments will now be described with reference to FIGS. 2-9 below.

Figure 2:
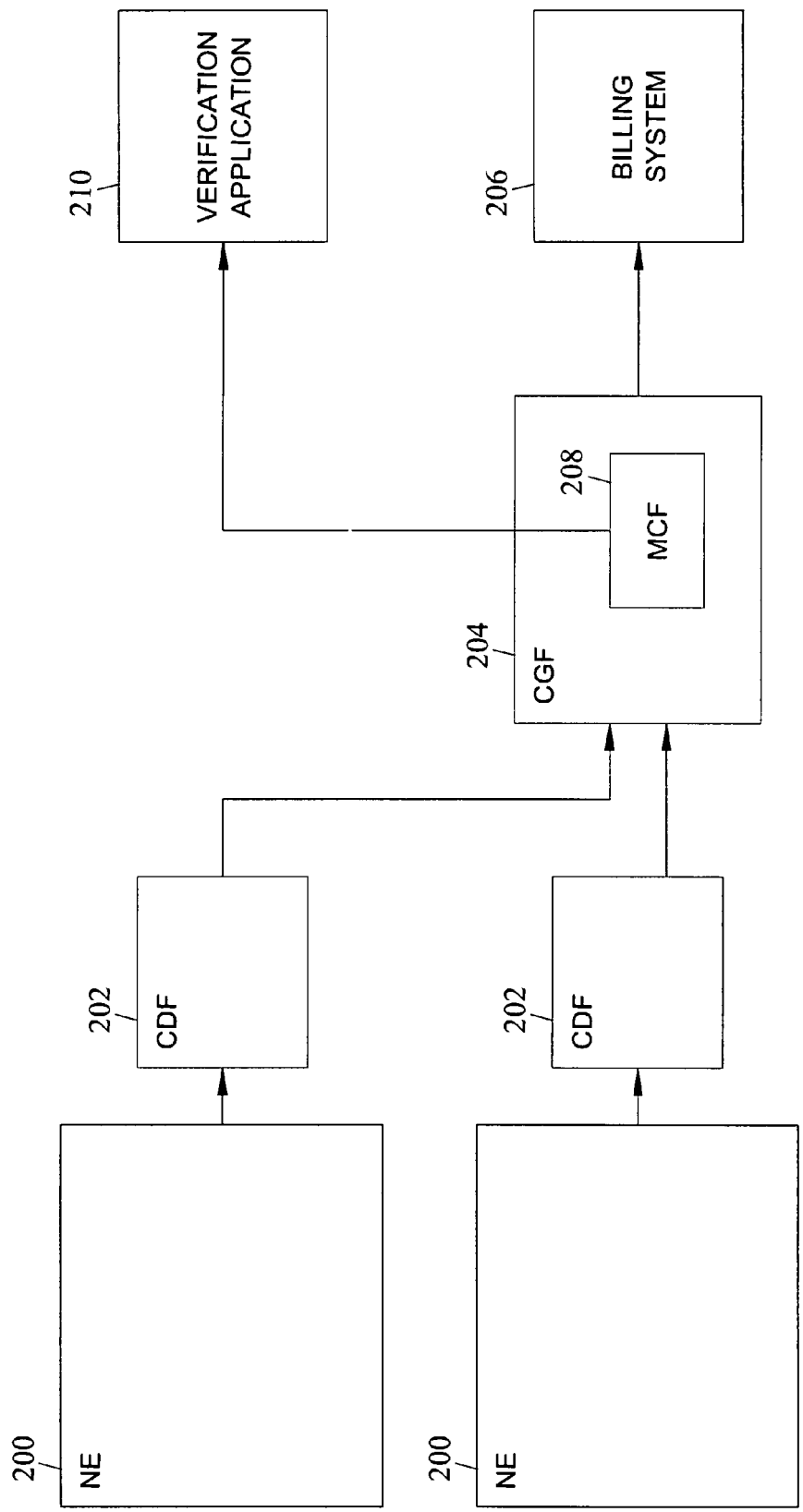
FIG. 2 is a block diagram of an exemplary non-integrated offline IMS system for providing billing and usage data to downstream applications according to an embodiment of the subject matter described herein.

FIG. 2 is a block diagram of an exemplary non-integrated offline IMS system for providing billing and usage data to downstream applications according to an embodiment of the subject matter described herein. The exemplary IMS charging architecture shown in FIG. 2 includes NE 200, CDF 202, CGF 204, billing system (BS), message copy function (MCF) 208, communications function (not shown), and verification application 210, where MCF 208 is co-located with CGF 204. Upon triggering a charging event, NE 200 may generate a message including information associated with the charging event. In one embodiment, the message generated by the CTF may be a Diameter accounting message, where Diameter is an authentication, authorization, and accounting (AAA) protocol. The Diameter message containing charging event information may be sent to CDFs 202, and CDFs 202 may generate a billing record, such as a charging detail record (CDR), based on the received raw Diameter charging event information. CDRs generated by CDFs 202 may be transmitted to CGF 204 where they may be correlated and sent to billing system (BS) 206. In addition, message copy function 208 located at CGF 204 may copy received CDRs and transmit them to one or more downstream applications, such as verification application 210, for processing. As described above with respect to FIG. 1, message copy function 208 may function independently from the functions performed by CDF 202.

Figure 3:
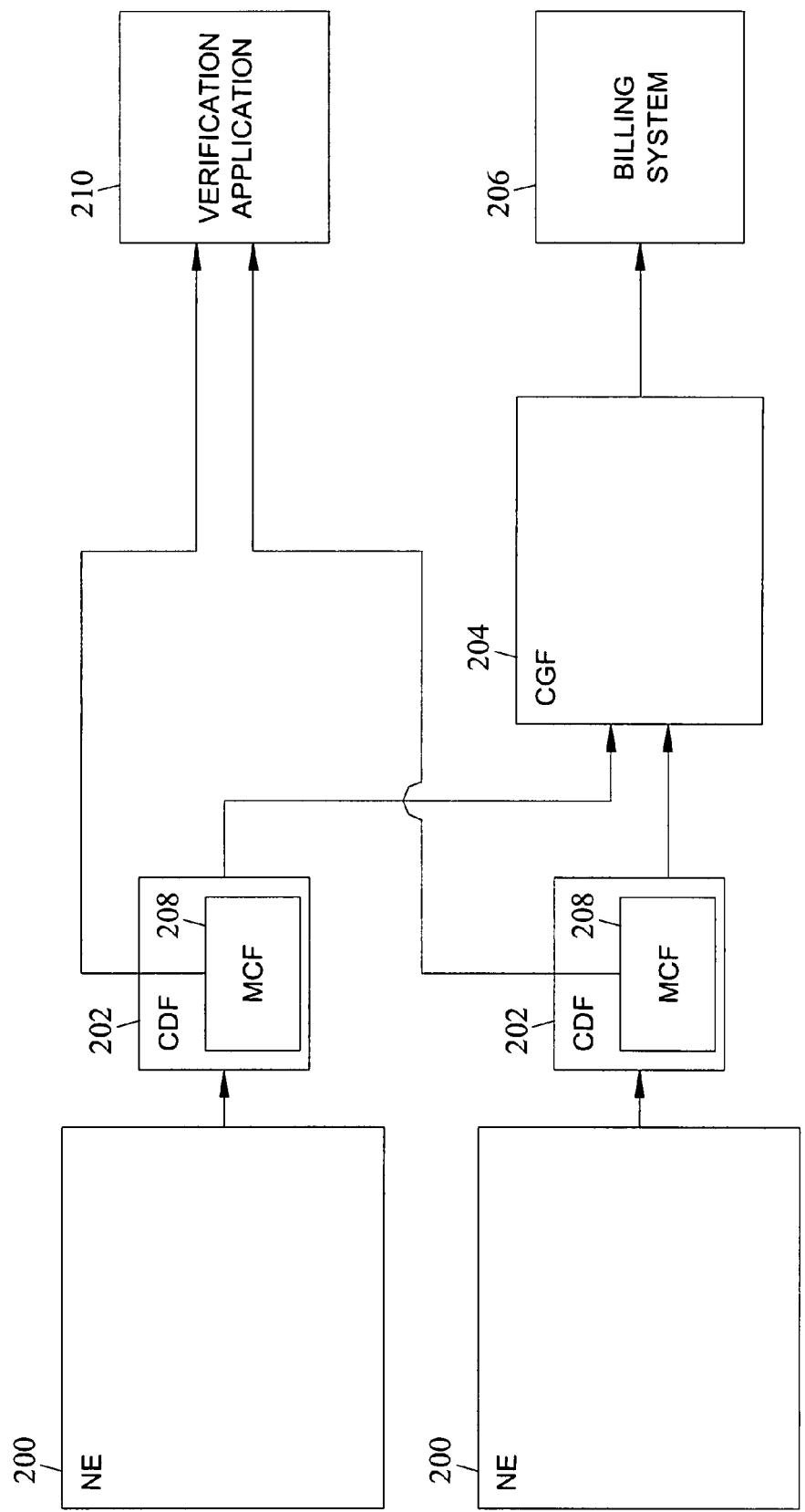
FIG. 3 is a block diagram of an alternate exemplary non-integrated offline IMS system for providing billing and usage data to downstream applications according to an embodiment of the subject matter described herein.

FIG. 3 is a block diagram of an alternate exemplary non-integrated offline IMS system for providing billing and usage data to downstream applications according to an embodiment of the subject matter described herein. Referring to FIG. 3, NE 200 may receive call signaling messages and generate IMS accounting messages based on the call signaling messages. For example, raw IMS accounting messages may be sent to CDF 202, where they may be converted into CDRs. In this embodiment, an instance of MCF 208 is located on each of CDFs 202 and may copy incoming or outgoing messages from CDF 202 depending on whether the user wishes to capture incoming raw IMS accounting messages, outgoing CDRs, or both. The CDRs generated by CDFs 202 may then passed to CGF 204 for correlation and routing to BS 206. BS 206 may use the CDRs received from CGF 204 to create billing information suitable for interacting with, for example, the billed subscriber. Messages copied by MCF 208 may be sent to one or more downstream applications for verification and analysis. It is appreciated that MCFs 208 located on each of CDFs 202 may copy messages traversing CDFs 202 independently from any conventional processing and routing these messages may undergo, thereby negligibly impacting the performance of CDFs 202 while providing application 210 with more accurate and timely information than conventional systems.

Figure 4:
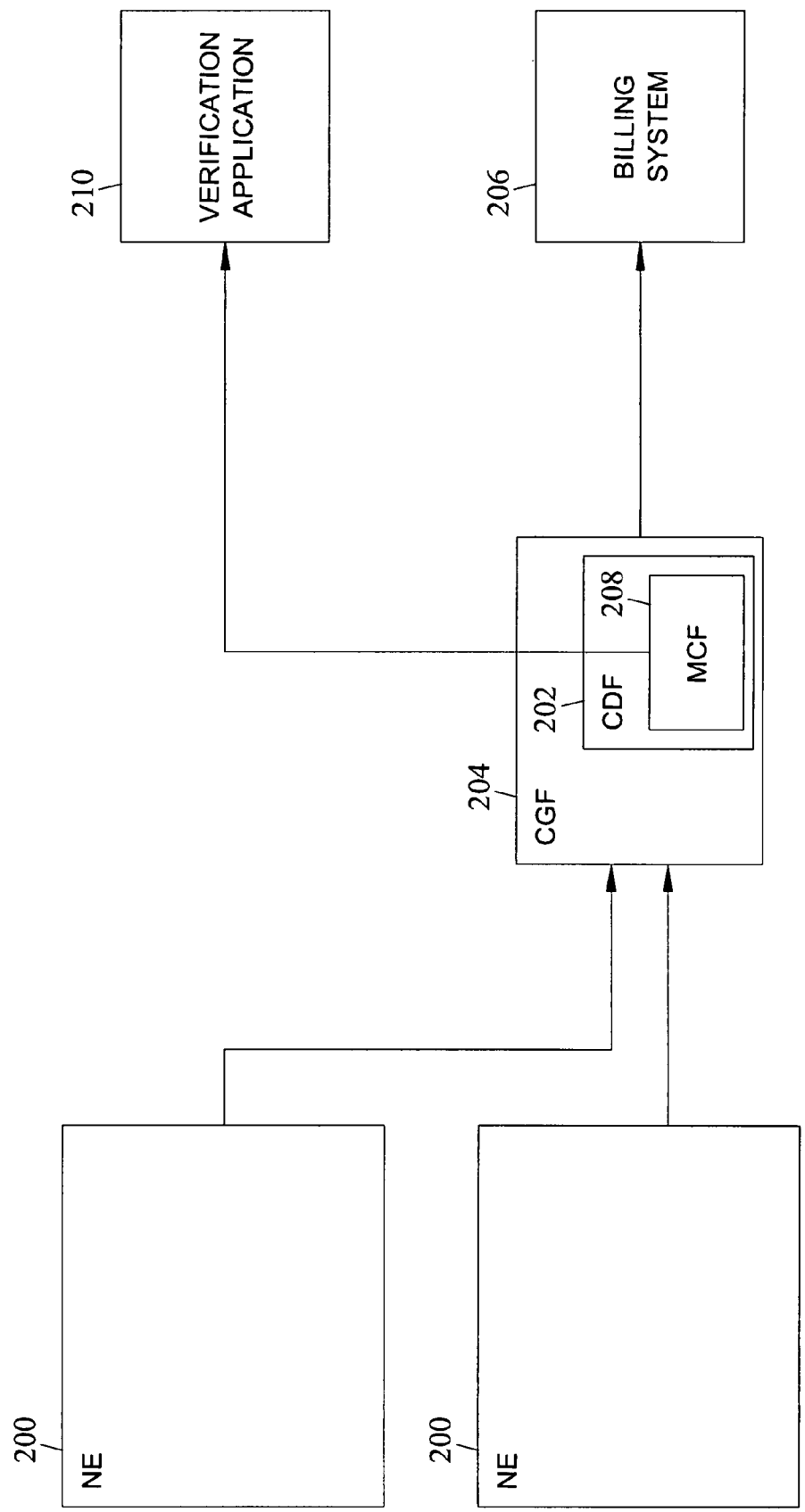
FIG. 4 is a block diagram of an alternate exemplary partially-integrated offline IMS system for providing billing and usage data to downstream applications according to an embodiment of the subject matter described herein.

FIG. 4 is a block diagram of an exemplary partially-integrated offline IMS system for providing billing and usage data to downstream applications according to an embodiment of the subject matter described herein. Referring to FIG. 4, CDF 202 may be integrated into CGF 204 and resulting combined CDF 202/CGF 204 may be separately located from NE 200. In this embodiment, MCF 208 may also be integrated into combined CDF 202/CGF 204 and may copy incoming IMS accounting messages before they have been converted into CDRs, may copy outgoing CDRs, or may copy both incoming IMS accounting messages and outgoing CDRs and provide them to verification application 210.

Figure 5:
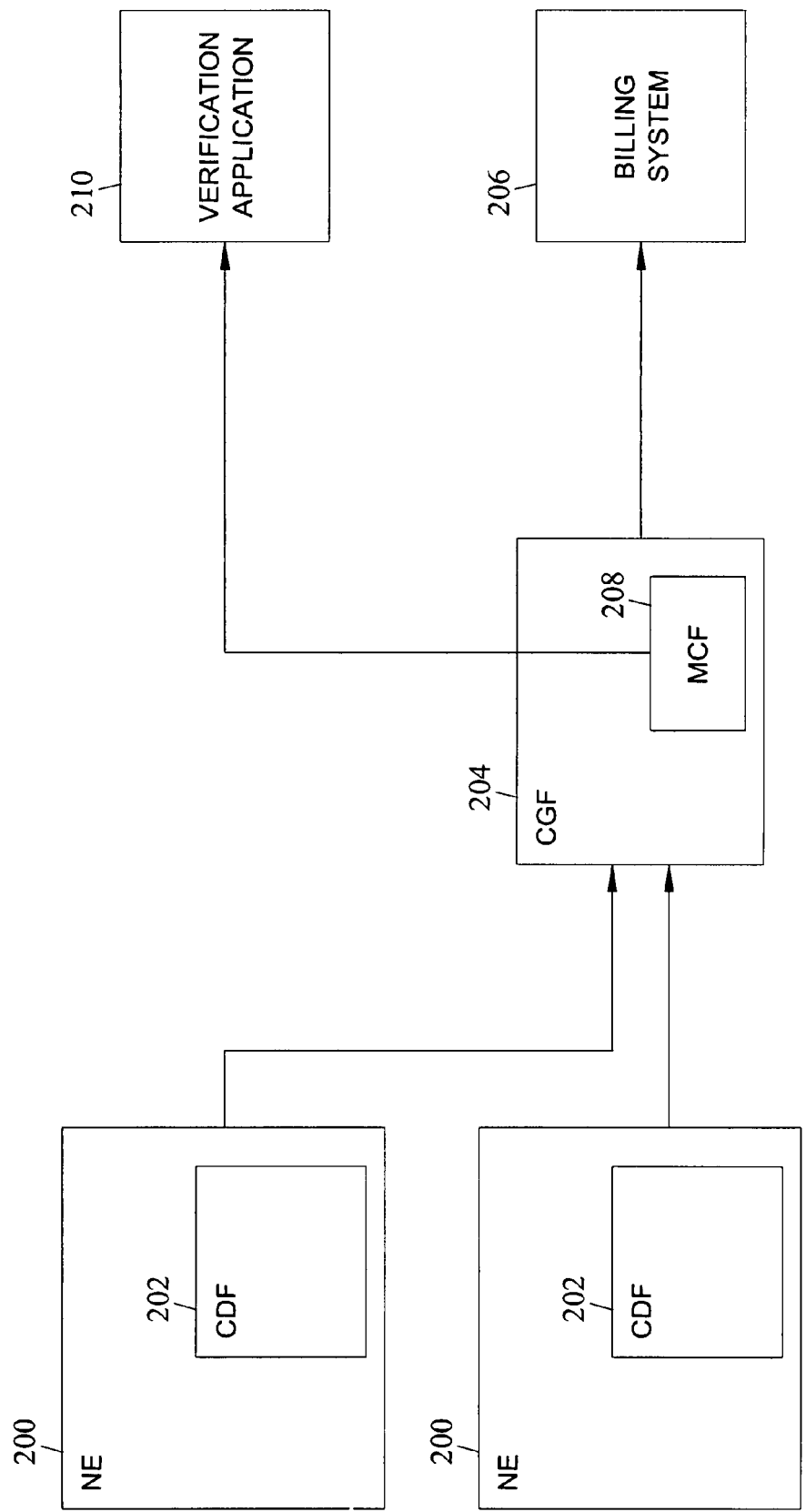
FIG. 5 is a block diagram of an alternate exemplary partially-integrated offline IMS system for providing billing and usage data to downstream applications according to an embodiment of the subject matter described herein.

FIG. 5 is a block diagram of an alternate exemplary partially-integrated offline IMS system for providing billing and usage data to downstream applications according to an embodiment of the subject matter described herein. Referring to FIG. 5, NEs 200 each include CDFs 202. Therefore, each combined NE 200/CDF 202 may receive SIP messages, generate IMS accounting messages, and internally convert them into CDRs, which may then be sent to CGF 204 for correlation. In this embodiment, MCF 208 is located at CGF 204, and therefore copies CDRs, regardless of whether the copying is performed on incoming messages as they are received by CGF 204 or on outgoing messages as they are sent to BS 208. It is appreciated that because MCFs 208 are located at combined NEs 200/CDFs 202, SIP messages and raw IMS accounting messages may not be copied in such an embodiment as that illustrated in FIG. 5.

Figure 6:
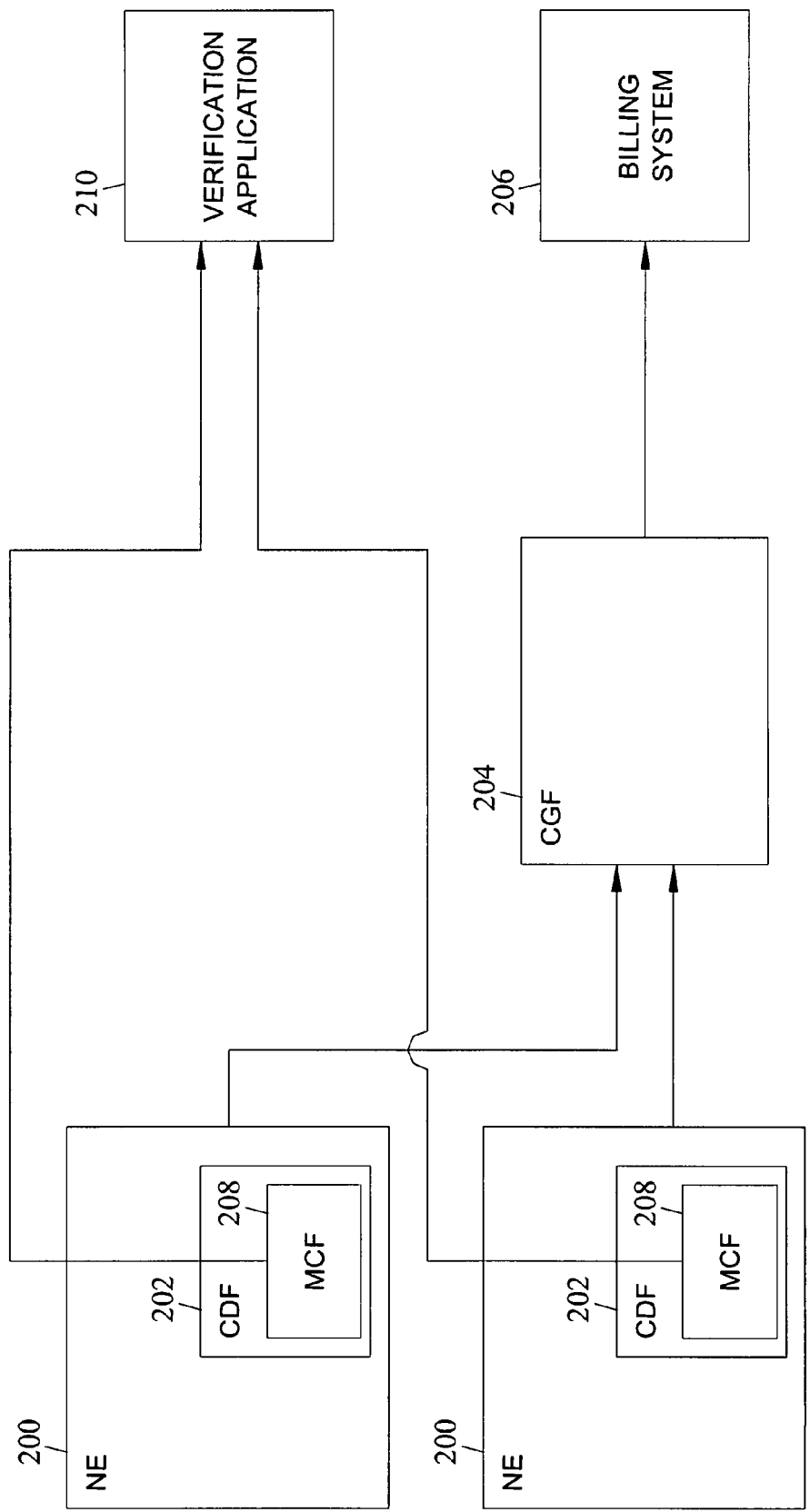
FIG. 6 is a block diagram of an alternate exemplary partially-integrated offline IMS system for providing billing and usage data to downstream applications according to an embodiment of the subject matter described herein.

FIG. 6 is a block diagram of an alternate exemplary partially-integrated offline IMS system for providing billing and usage data to downstream applications according to an embodiment of the subject matter described herein. Referring to FIG. 6, NE 200, CDF 202, and CGF 204 are in the same configuration as that of FIG. 5 discussed above. However, in FIG. 6, MCF 208 is located at each combined NE 200/CDF 202 instead of at CGF 204. By locating MCF 208 at combined NE 200/CDF 202, MCF 208 may copy call signaling messages received by NE 200, raw IMS accounting messages before they have been converted by co-located CDF 202, or CDRs after they have been converted by CDF 202 but prior to sending them to CGF 204. Because the message copy streams generated by MCFs 208 may be sent directly to application 210 without correlation or screening by CGF 204, it is appreciated that additional logic may be implemented in application 210 in order to correlate and process the message copies provided by MCFs 208 in this embodiment.

Figure 7:
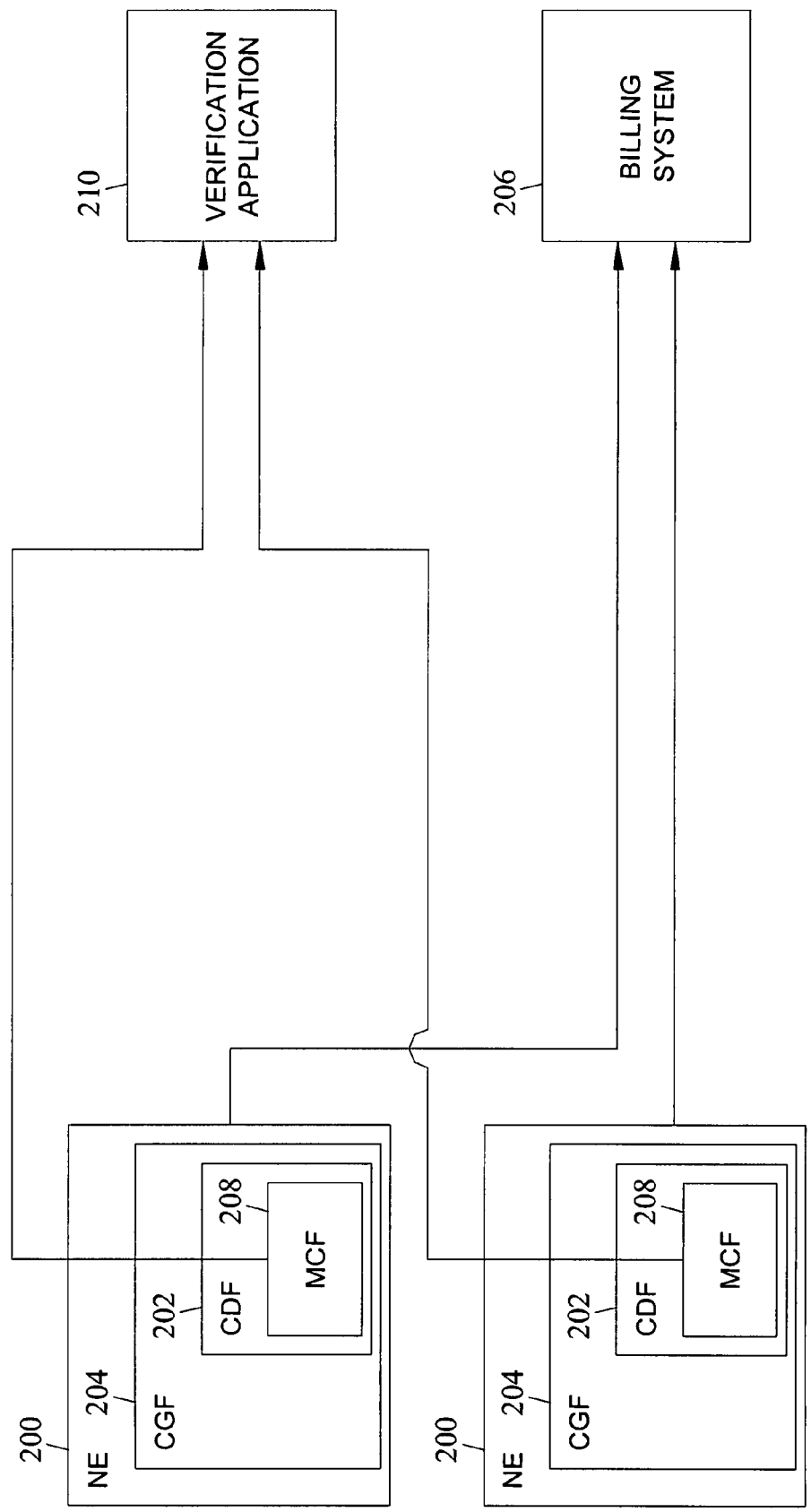
FIG. 7 is a block diagram of an exemplary fully-integrated offline IMS system for providing billing and usage data to downstream applications according to an embodiment of the subject matter described herein.

FIG. 7 is a block diagram of an exemplary fully-integrated offline IMS system for providing billing and usage data to downstream applications according to an embodiment of the subject matter described herein. Referring to FIG. 7, MCF 208, CGF 204, and CDF 202 are all co-located with and/or incorporated into each of NEs 200. In this fully integrated embodiment, MCFs 208 may copy call signaling messages, raw IMS accounting messages, CDRs, or any combination thereof and forward the copied messages directly to downstream applications 210. The message copying performed by MCFs 208 may be performed independently from the conventional flow of CDR messages sent to BS 208.

Figure 8:
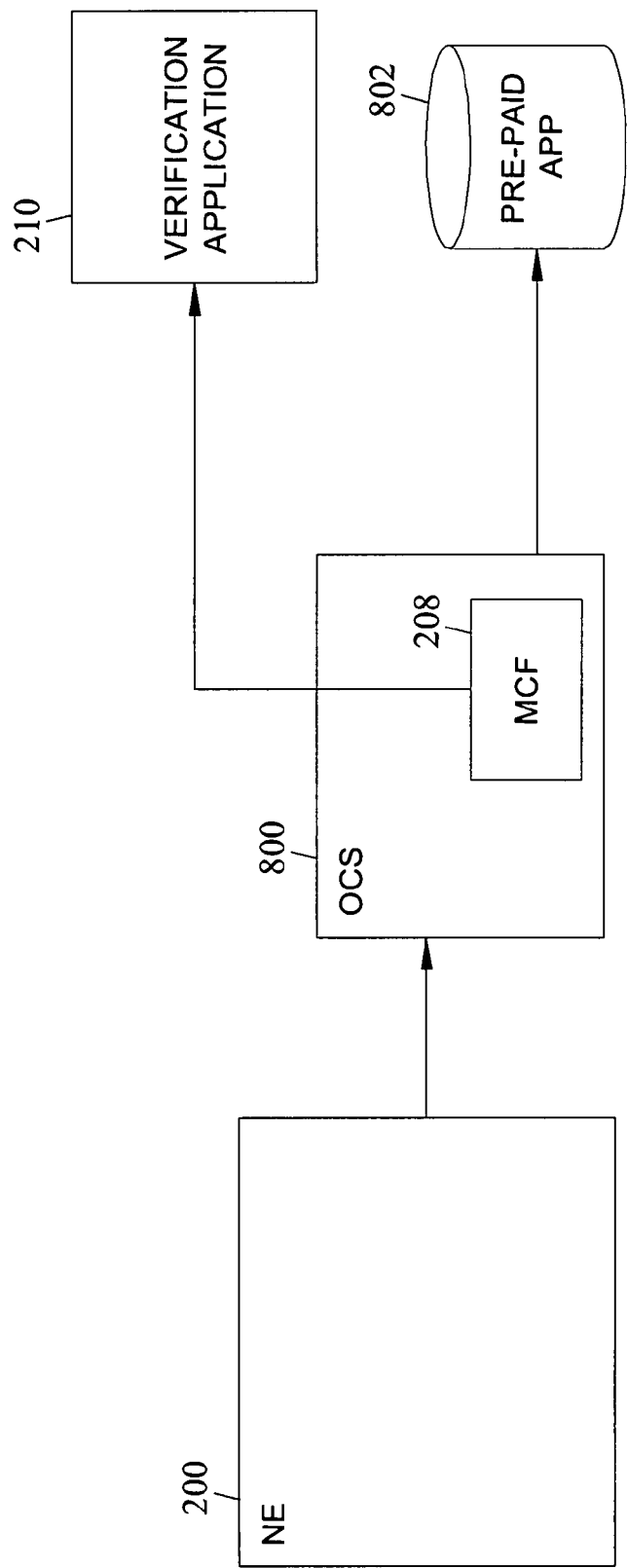
FIG. 8 is a block diagram of an exemplary non-integrated online IMS system for providing billing and usage data to downstream applications according to an embodiment of the subject matter described herein.

FIG. 8 is a block diagram of an exemplary non-integrated online IMS system for providing billing and usage data to downstream applications according to an embodiment of the subject matter described herein. Referring to FIG. 8, NE 200 may receive call signaling messages and generate corresponding IMS accounting messages. IMS accounting messages may be sent to online charging system (OCS) 800 for processing. Because FIG. 8 illustrates an online embodiment, no CDRs are generated by OCS 800. Rather, OCS 800 determines in real-time or near real-time whether the subscriber is authorized to perform a given action based on their prepaid credit status. Depending on whether, for example, immediate event charging (IEC) or event charging with unit reservation (ECUR) is used, OCS 800 may immediately authorize or disallow the completion of a chargeable event or may reserve a number of prepaid credits and either reauthorize additional credits or terminate a subscriber's session once the reserved credits have been used. This determination may be made in conjunction with prepaid application 802 which contains prepaid credit status information associated with subscribers. For example, OCS 800 may query prepaid application 802 to determine whether a subscriber possesses enough credit to complete a desired transaction, such as a placing VoIP call or delivering a text message. Additionally, OCS 800 may include MCF 208 for copying IMS accounting messages received from NE 200 and providing the copied messages to a downstream application, such as verification application 210. MCF 208 may copy unrated IMS accounting messages associated with a charging event, rated IMS accounting messages received from a rating function, rated IMS accounting messages further containing credit information generated by an account balance management function, or any combination thereof.

Figure 9:
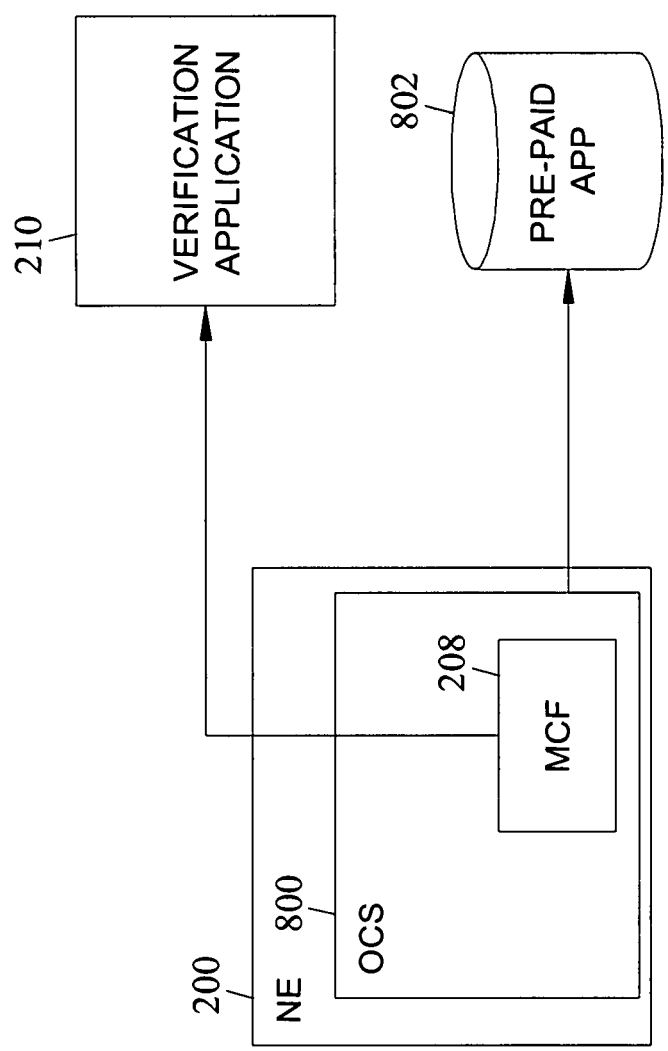
FIG. 9 is a block diagram of an exemplary fully-integrated online IMS system for providing billing and usage data to downstream applications according to an embodiment of the subject matter described herein.

FIG. 9 is a block diagram of an exemplary fully-integrated online IMS system for providing billing and usage data to downstream applications according to an embodiment of the subject matter described herein. Referring to FIG. 9, OCS 800 and MCF 208 may be included in or co-located with NE 200. In this embodiment, IMS accounting messages containing charging event information may be generated by NE 200 upon detecting a charging event based on received call signaling messages. The IMS messages may be communicated internally to OCS 800 for a real-time or near real-time determination regarding whether the subscriber associated with the SIP session or event possesses enough credit to perform the transaction. As described above with respect to FIG. 8, OCS 800 may also communicate with prepaid application 802 for making this determination. As opposed to the system illustrated in FIG. 8, MCF 208 is located on integrated NE 200/OCS 800 in the embodiment illustrated in FIG. 9. Therefore, in addition to copying at least one of an unrated IMS accounting message associated with a charging event, a rated IMS accounting message received from a rating function, and a rated IMS accounting message also containing credit information generated by an account balance management function, MCF 208 may also copy SIP messages received by NE 200.

Figure 10:
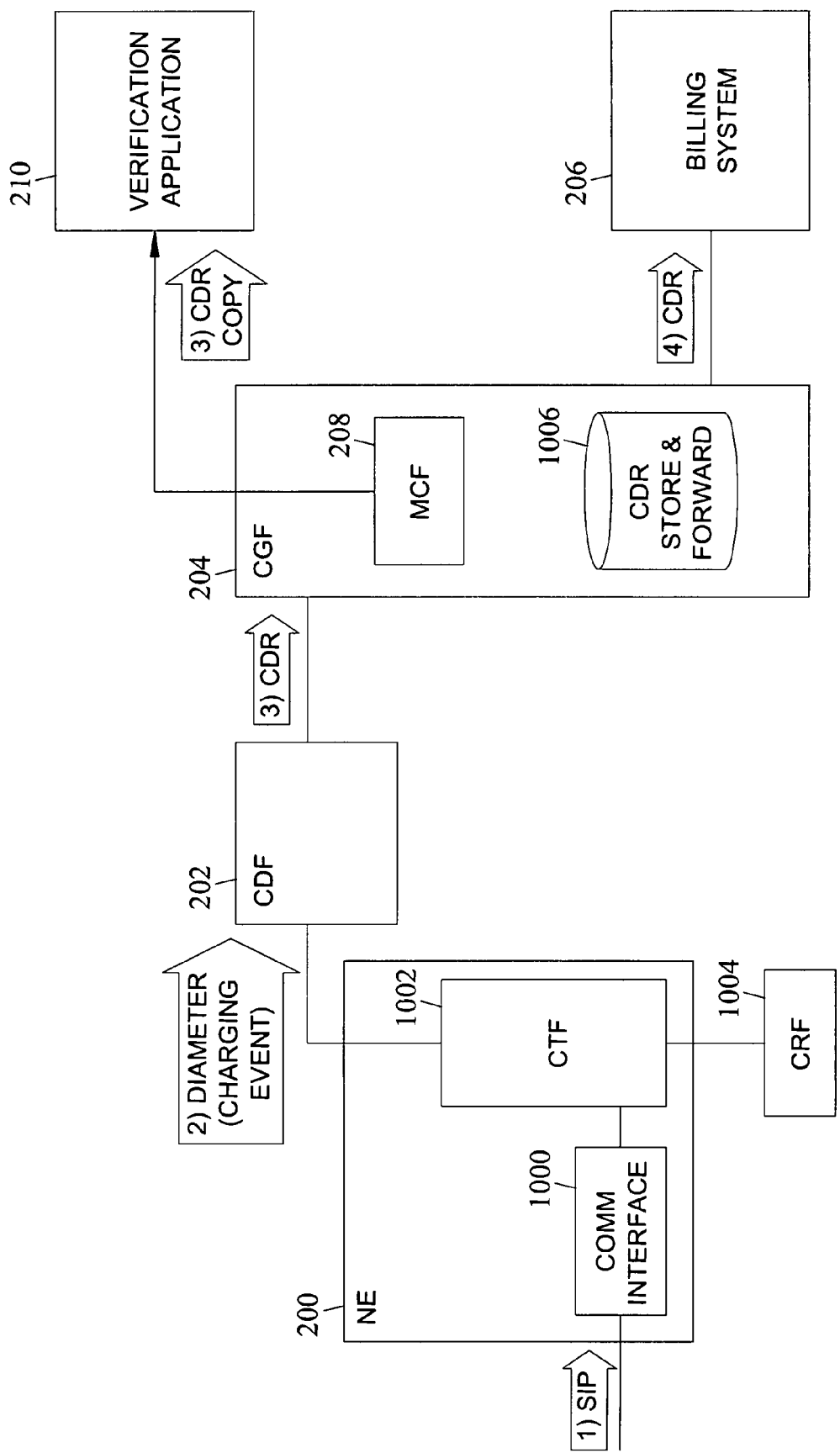
FIG. 10 is a more detailed block diagram of an exemplary non-integrated offline IMS system including a single message copy function for providing billing and usage data to downstream applications according to an embodiment of the subject matter described herein.

FIG. 10 is a more detailed block diagram of an exemplary non-integrated offline system for providing billing and usage data to downstream applications according to the subject matter described herein. Referring to FIG. 10, NE 200 may, for example, receive a SIP message associated with a SIP session at communications interface 1000. Communications interface 1000 may communicate with charging trigger function (CTF) 1002 for determining whether a charging event occurred. CTF 1002 may also communicate with charging rules function (CRF) 1004 for determining whether a charging event has occurred. As shown in FIG. 10, it is appreciated that CRF 1004 may be located external to NE 200 and that charging rules stored in CRF 1004 may be edited by network operators via any suitable interface. For a charging event, CTF 1002 may generate a raw IMS accounting message including information associated with the charging event.

The raw IMS accounting message including charging event information may be sent to CDF 202, where it may be converted into an CDR. CDF 202 may examine the charging event information contained in the raw IMS accounting message and generate one or more CDRs. Because charging networks may include multiple CDFs 202 (e.g. one CDF 202 for each NE 200), a CDR generated by CDF 202 may be sent to CGF 204 for correlation and screening. In FIG. 10, CDF 202 may send a generated CDR to CGF 204, however it is appreciated that CGF 204 may also receive CDRs from multiple CDFs 202 (not shown). CDRs received by CGF 204 may be temporarily stored in CDR store-and-forward database (DB) 1006 until delivery to BS 206 has been completed. CGF 204 may store multiple CDRs and forward them to BS 206 based on a predetermined schedule or other criteria.

However, because downstream applications 210 may benefit from receiving CDRs independently from BD 208, message copy function 208 may be located on CGF 204 and configured to copy all received CDRs and, in conjunction with a communications function (not shown), immediately forward them to application 210. One advantage of the subject matter illustrated in FIG. 10 includes detecting fraud earlier than in conventional charging verification systems.

Figure 11:
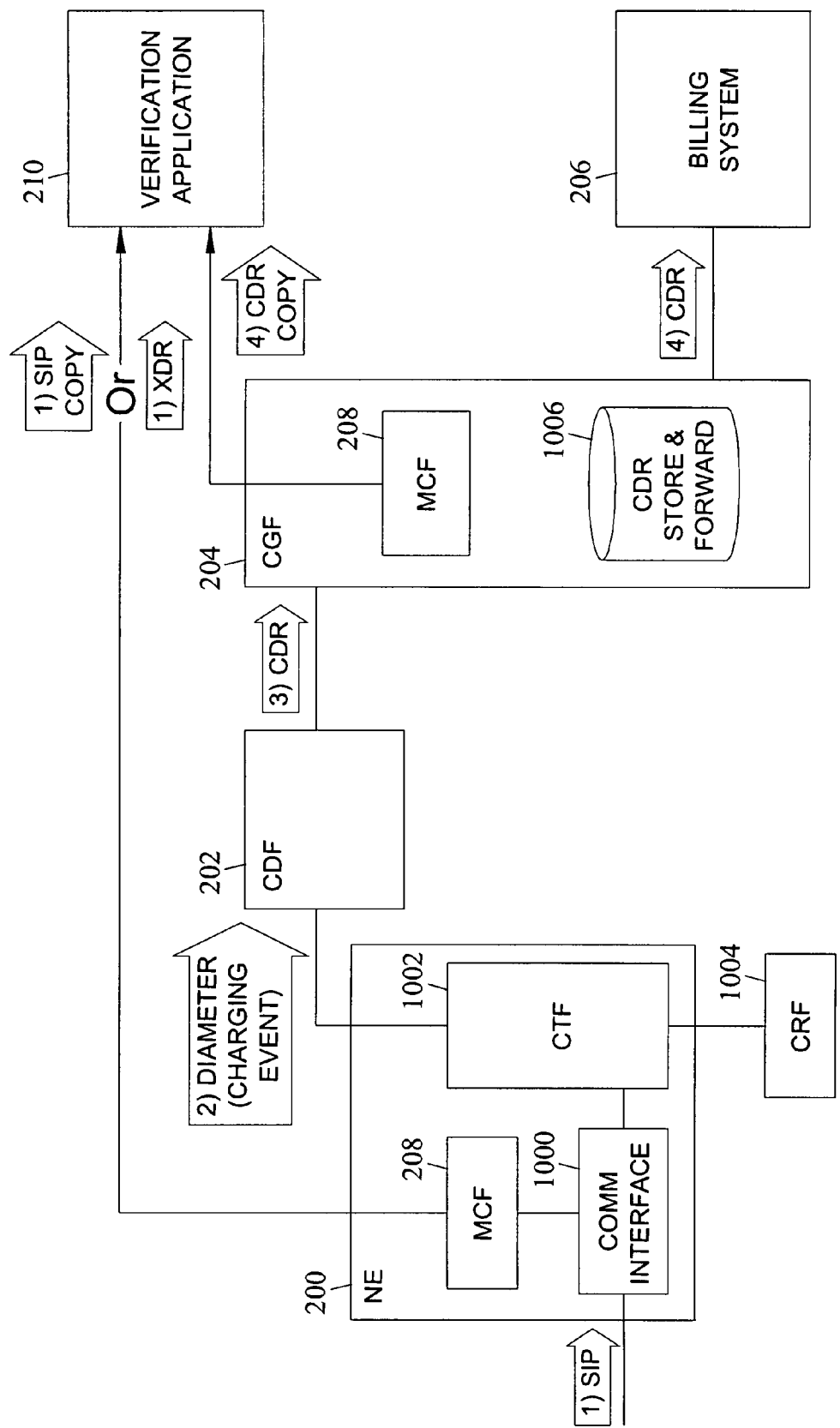
FIG. 11 is a more detailed block diagram of an exemplary non-integrated offline IMS system including two message copy functions for providing billing and usage data to downstream applications according to an embodiment of the subject matter described herein.

FIG. 11 is a more detailed block diagram of an exemplary non-integrated offline IMS system including two message copy functions for providing billing and usage data to downstream applications according to an embodiment of the subject matter described herein. Referring to FIG. 11, as described above, network entity 200 includes communications interface 1000 for receiving SIP messages and CTF 1002 and CRF 1004 for generating raw IMS accounting messages based on received SIP messages in conjunction with CRF 1004, as well as an instance of MCF 208 for copying incoming SIP messages and/or IMS accounting messages generated by CTF 1002. IMS accounting messages sent to CDF 202 for conversion into a CDR may then be passed to CGF 204 where store and forward logic may be applied before sending the CDRs to BS 206. A second instance of MCF 208 may be located at CGF 204 for copying incoming CDRs. The messages copied by the first and second instances of MCF 208 located at NE 200 and CGF 204, respectively, may be provided to downstream application 210 in a manner as described above for performing, for example, billing verification. Because verification application 210 may receive multiple types of messages associated with a common chargeable event or session, it is appreciated that application 210 may, for example, determine whether fraud has occurred by comparing a first copied message type with a second copied message type.

In one scenario, application 210 may receive multiple SIP call signaling messages associated with a SIP session from a first instance of MCF 208 located at NE 200 and may fail to receive CDR message copies corresponding to the same session from a second instance of MCF 208 located at CGF 204. Thus, application 210 may determine that the subscriber associated with the SIP messages has successfully completed a SIP session, yet no billing information was generated. This may result, for example, from CTF 1002 failing to generate raw IMS accounting messages associated with the session or, alternatively, may result from CDF 202 failing to convert received raw IMS accounting messages into CDRs. Depending on the number and location of the message copy functions 208, and thus the types, timeliness and accuracy of the data provided to application 210, network operators may be better able to identify and correct billing errors and/or fraud.

Figure 12:
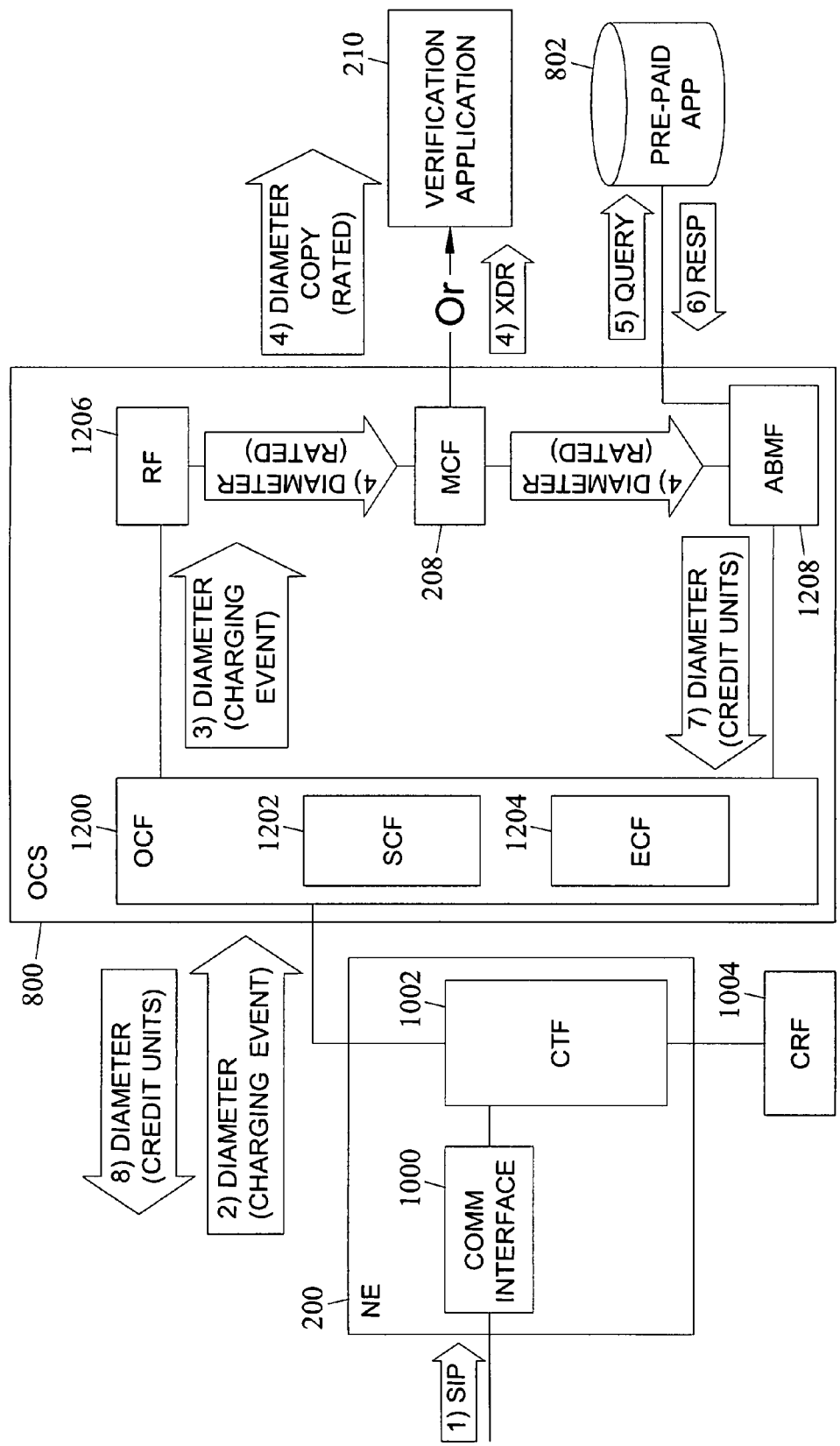
FIG. 12 is a more detailed block diagram of an exemplary non-integrated online IMS system including a single message copy function for providing billing and usage data to downstream applications according to an embodiment of the subject matter described herein.

FIG. 12 is a more detailed block diagram of an exemplary non-integrated online IMS system including a single message copy function for providing billing and usage data to downstream applications according to an embodiment of the subject matter described herein. Referring to FIG. 12, NE 200 may receive call signaling messages associated with a SIP session or event at communications interface 1000. Connected to communications interface 1000 is CTF 1002 that may generate IMS accounting messages based on observed SIP messages, where the generated IMS accounting messages are associated with a charging event. The IMS charging event message may be sent to online charging system (OCS) 800 for processing.

OCS 800 may include an online charging function (OCF) 1200 for determining, based on the received IMS charging event information, the type of charging to apply to the transaction. For example, OCF 1002 may include a session charging function (SCF) 1202 for determining applicable charges associated with a SIP session and an event charging function (ECF) for determining applicable charges associated with a SIP event. It is appreciated, however, that additional charging functions may be included in OCF 1200 without departing from the scope of the subject matter described herein.

IMS charging event messages may be sent from OCF 1200 to a rating function (RF) 1206 for converting the information included in the IMS message into a IMS message that includes a monetary cost associated with the transaction. Rated IMS messages may be communicated to an account balance management function (ABMF) 1208 for processing, where ABMF 1208 may query prepaid application 802 to determine, for example, whether the user possesses enough prepaid credit to perform the transaction. In the embodiment illustrated in FIG. 12, MCF 208 and communications function (not shown) may copy rated IMS messages communicated between RF 1206 and ABMF 1208 and provide them to downstream verification application 210 for one of data analysis, fraud detection, or revenue assurance. However, it is appreciated that MCF 208 may also be located in the communications path between ABMF 1208 and OCF 1200, or located on NE 200, and may include multiple instances of MCF 208 for copying multiple message types from multiple locations within an IMS charging network.

Figure 13:
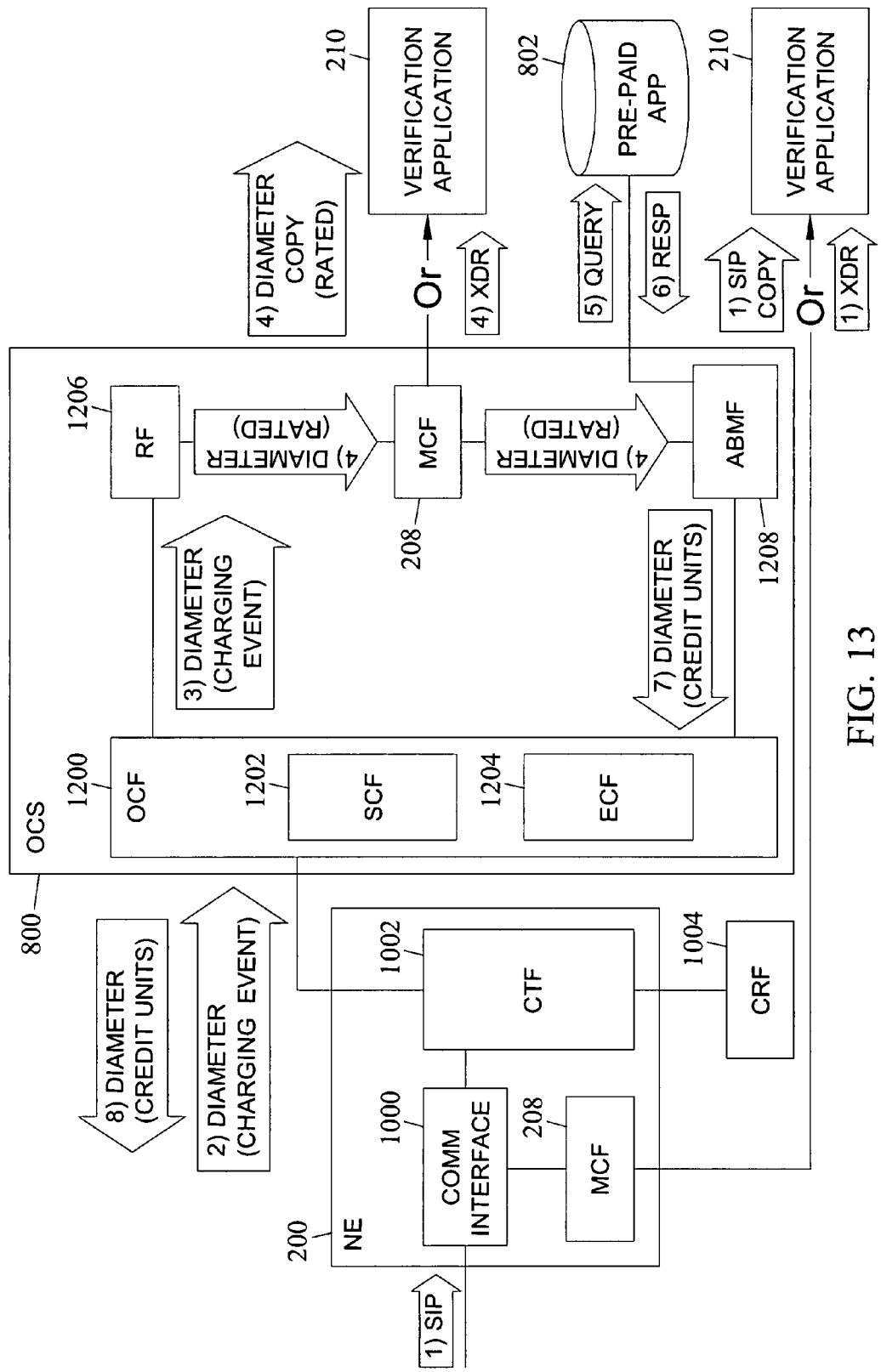
FIG. 13 is a more detailed block diagram of an exemplary non-integrated online IMS system including two message copy functions for providing billing and usage data to downstream applications according to an embodiment of the subject matter described herein.

FIG. 13 is a more detailed block diagram of an exemplary non-integrated online IMS system including two message copy functions for providing billing and usage data to downstream applications according to an embodiment of the subject matter described herein. Referring to FIG. 13, a SIP message may be received by combined NE 200/OCS 800. Thus, IMS accounting messages associated with charging events may be communicated internally between the functions illustrated in FIG. 13. The process of generating charging event information, applying appropriate charges (i.e. session, event, etc.), rating the charging event, and determining whether the subscriber possesses enough credit to complete the transaction may all be performed in the same manner as that described above with respect to FIG. 12. However, in the embodiment illustrated in FIG. 13, MCF 208 may be configured to copy multiple types of messages. For example, MCF 208 may copy one or more of a SIP message received from communication interface 1000, an unrated IMS accounting message received from CTF 1002, a IMS message received from OCF 1200, a rated IMS accounting message received from RF 1206, a rated IMS accounting message further containing credit unit information received from ABMF 1208. One or more of these message types may be provided to verification application 210 for examination or comparison.

According to another aspect of the embodiment illustrated in FIG. 13, MCF 208 located at NE 200 may generate IMS accounting messages, such as CDRs, based on observed signaling messages and provide the generated messages to application 210. In this scenario, a first stream of CDRs based on SIP or SS7 call signaling messages received by NE 200 may be generated by MCF 208 and a second stream of CDRs may be generated by MCF 208 located at OCS 800. The first and second CDR streams may be provided to verification application 210 and compared, for example, in order to detect billing irregularities. Because each stream of CDRs may relate to the same session or transaction, while being generated at different points within the charging network, they may form the basis of a comparison performed by application 210 for detecting discrepancies and detecting potential fraud.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for acquiring billing and usage data in an Internet protocol (IP) multimedia subsystem (IMS) environment, the method comprising:

copying, by at least one message copy function in at least one Internet protocol (IP) multimedia subsystem (IMS) network element, a call signaling message and an IMS accounting message relating to an IMS transaction upstream from a billing system (BS), wherein the IMS accounting message is a Diameter protocol-based message, wherein the call signaling message includes a signaling system number 7 (SS7) message, a session initiation protocol (SIP) message, a SIGTRAN message, or a call detail record (CDR), and wherein the IMS accounting message includes a charging detail record;

providing, by at least one communications function in the at least one IMS network element, the copied call signaling message and the copied IMS accounting message to an application for one of billing verification and fraud detection by comparing the copied call signaling message and the copied IMS accounting message, wherein the call signaling message and the IMS account message are destined for a destination different from the application; and correcting, by the application, information contained in the IMS accounting message based on the copied call signaling message.

2. The method of claim 1 comprising examining one of the call signaling message and the IMS accounting message for one of billing verification, fraud detection, revenue assurance, and data analysis.

3. The method of claim 1 wherein the CDR includes one of an SS7 call detail record, an Internet Protocol call detail record (IPDR), a session call detail record (SDR), and a transaction call detail record (TDR).

4. The method of claim 1 wherein copying the call signaling message and the IMS accounting message includes copying a raw IMS accounting message that includes at least one of charging event information, rated charging event information, and rated charging event and credit information, where the copied IMS accounting message is not an charging detail record.

5. The method of claim 1 wherein copying the call signaling message and the IMS accounting message includes copying an IMS accounting message that includes a charging detail record.

6. The method of claim 1 wherein copying the call signaling message and the IMS accounting message includes copying a call signaling message and wherein the method further comprises generating an IMS accounting message based on the copied call signaling message.

7. The method of claim 1 wherein copying the call signaling message and the IMS accounting message includes copying the IMS accounting message at a charging gateway function (CGF) in an offline IMS charging system.

8. The method of claim 1 wherein copying the call signaling message and the IMS accounting message includes copying the IMS accounting message at a charging data function (CDF) in an offline IMS billing system.

9. The method of claim 1 wherein copying the call signaling message and the IMS accounting message includes copying the call signaling message at an IMS network entity (NE).

10. The method of claim 9 wherein copying the call signaling message and the IMS accounting message includes copying the call signaling message at one of a call session control function (CSCF), a circuit-switched network element (CS-NE), a service network element, a session initiation protocol (SIP) application server (AS), a media resource function controller (MRFC), a media gateway controller function (MGCF), a border gateway controller function (BGCF), a proxy call session control function (P-CSCF), an interrogating call session control function (I-CSCF), a serving call session control function (S-CSCF), a serving general packet radio service (GPRS) support node (SGSN), and a gateway GPRS support node (GGSN).

11. The method of claim 1 wherein copying the call signaling message and the IMS accounting message includes copying an IMS accounting message received from a rating function (RF) in an online IMS charging system.

12. The method of claim 1 wherein copying the call signaling message and the IMS accounting message includes copying an IMS accounting message received from an account balance management (ABMF) function in an online IMS charging system.

13. A system for acquiring billing and usage data in an Internet protocol (IP) multimedia subsystem (IMS) environment, the system comprising:

at least one message copy function (MCF) in at least one Internet protocol (IP) multimedia subsystem (IMS) network element, the MCF for copying a call signaling message and an IMS accounting message relating to an IMS transaction upstream from a billing system (BS), wherein the call signaling message includes a signaling system number 7 (SS7) message, a session initiation protocol (SIP) message, a SIGTRAN message, or a call detail record (CDR), and wherein the IMS accounting message includes a charging detail record; and a communications function in the at least one IMS network element, the communications function for providing the copied call signaling message and the copied IMS accounting message to an application for one of billing verification and fraud detection by comparing the copied call signaling message and the copied IMS accounting message, wherein the call signaling message and the IMS account message are destined for a destination different from the application, wherein the application corrects information contained in the IMS accounting message based on the copied call signaling message.

14. The system of claim 13 wherein the application examines one of the call signaling message and the IMS accounting message for one of billing verification, fraud detection, revenue assurance, and data analysis.

15. The system of claim 13 wherein a raw IMS accounting message includes at least one of charging event information, rated charging event information, and rated charging event and credit information, where the copied raw IMS accounting message is not a charging detail record.

16. The system of claim 13 wherein the CDR includes at least one of an SS7 call detail record, an Internet protocol (IP) call detail record (IPDR), a session call detail record (SDR), and a transaction call detail record (TDR).

17. The system of claim 13 wherein the application is configured to, based on a copied call signaling message, at least one of generate an IMS accounting message, and complete information missing from a copied IMS accounting message.

18. The system of claim 13 wherein the MCF is located at a network entity (NE).

19. The system of claim 18 wherein the NE is one of a call session control function (CSCF), a circuit-switched network element (CS-NE), a service network element, a session initiation protocol (SIP) application server (AS), a media resource function controller (MRFC), a media gateway controller function (MGCF), a border gateway controller function (BGCF), a proxy call session control function (P-CSCF), an interrogating call session control function (I-CSCF), a serving call session control function (S-CSCF), a serving general packet radio service (GPRS) support node (SGSN), and a gateway GPRS support node (GGSN).

20. The system of claim 13 wherein the MCF is located at a charging gateway function (CGF) in an offline IMS charging system.

21. The system of claim 13 wherein the MCF is located at a charging data function (CDF) in an offline IMS charging system.

22. The system of claim 13 wherein the MCF is integrated with an online charging system (OCS).

23. The system of claim 13 wherein the MCF is configured to receive an IMS accounting message from a rating function (RF) in an online IMS charging system.

24. The system of claim 13 wherein the MCF is configured to copy an IMS accounting message received from an account billing management function (ABMF) in an online IMS charging system.

25. A computer program product comprising computer-executable instructions embodied in a non-transitory computer-readable medium for performing steps comprising:
  in an Internet protocol (IP) multimedia subsystem (IMS) environment:
    copying, by at least one message copy function (MCF) in the at least one Internet protocol (IP) multimedia subsystem (IMS) network element, a call signaling message and an IMS accounting message relating to an IMS transaction upstream from a billing system (BS), wherein the IMS accounting message is a Diameter protocol-based message, wherein the call signaling message includes a signaling system number 7 (SS7) message, a session initiation protocol (SIP) message, a SIGTRAN message, or a call detail record (CDR), and wherein the IMS accounting message includes a charging detail record;
  providing, by at least one communications function in the at least one IMS network element, the copied call signaling message and the copied IMS accounting message to an application for one of billing verification and fraud detection by comparing the copied call signaling message and the copied IMS accounting message, wherein the call signaling message and the IMS account message are destined for a destination different from the application; and
  correcting, by the application, information contained in the IMS accounting message based on the copied call signaling message.

\* \* \* \* \*